United States Patent
Koch et al.

(10) Patent No.: US 11,283,396 B2
(45) Date of Patent: Mar. 22, 2022

(54) SOLAR PANEL MOUNTING SYSTEM AND METHOD

(71) Applicant: SolarOff Systems, LLC, Collegeville, PA (US)

(72) Inventors: Stuart Koch, Audubon, PA (US); Jon Costanza, Collegeville, PA (US)

(73) Assignee: SolarOff Systems, LLC

( * ) Notice: Subject to any disclaimer, the term of this patent is extended or adjusted under 35 U.S.C. 154(b) by 0 days.

(21) Appl. No.: 16/695,353

(22) Filed: Nov. 26, 2019

(65) Prior Publication Data

US 2020/0169214 A1 May 28, 2020

Related U.S. Application Data

(60) Provisional application No. 62/771,642, filed on Nov. 27, 2018.

(51) Int. Cl.

| | |
|---|---|
| H02N 6/00 | (2006.01) |
| H01L 31/042 | (2014.01) |
| H02S 30/10 | (2014.01) |
| F24S 25/35 | (2018.01) |
| F24S 25/40 | (2018.01) |
| H02S 40/36 | (2014.01) |
| H02S 20/23 | (2014.01) |
| F24S 25/61 | (2018.01) |
| F24S 25/60 | (2018.01) |

(52) U.S. Cl.
CPC ............. *H02S 30/10* (2014.12); *F24S 25/35* (2018.05); *F24S 25/40* (2018.05); *F24S 25/61* (2018.05); *H02S 20/23* (2014.12); *H02S 40/36* (2014.12); *F24S 2025/6006* (2018.05)

(58) Field of Classification Search
CPC .......... H02S 30/10; H02S 20/23; F24S 25/35; F24S 2025/6006
See application file for complete search history.

(56) References Cited

U.S. PATENT DOCUMENTS

| | | | |
|---|---|---|---|
| 2008/0250614 A1* | 10/2008 | Zante | F16B 5/0657 24/542 |
| 2011/0303262 A1* | 12/2011 | Wolter | H02S 40/36 136/251 |
| 2014/0042286 A1* | 2/2014 | Jaffari | F16B 2/065 248/316.4 |

(Continued)

*Primary Examiner* — Angelo Trivisonno
(74) *Attorney, Agent, or Firm* — The Belles Group, P.C.

(57) ABSTRACT

A solar panel mounting system for forming a solar array includes longitudinal support rails mounted to a support structure such as a roof. A first solar panel disposed on the rails has a peripheral frame including a locking frame member with deformable clamping portion configured for slideably receiving a peripheral frame portion of an adjacent second solar panel. A pair of captive T-bolt sets passing through the clamping portion include T-bolts having locking heads and nuts frictionally engaged with the T-bolts to rotate the T-bolts. The heads are each inserted and rotationally locked into fastening channels of respective support rails. The second solar panel is inserted into the first panel clamping portion and the nuts are fully tightened producing a clamping action which locks the first and second panels together. Power/control cables may be routed inside covered cable compartments on rears of the panels for protection against rodent damage.

30 Claims, 15 Drawing Sheets

(56) References Cited

U.S. PATENT DOCUMENTS

| | | | |
|---|---|---|---|
| 2014/0102516 A1* | 4/2014 | Sun | H02S 30/10 |
| | | | 136/251 |
| 2015/0101997 A1* | 4/2015 | Liu | F24S 25/61 |
| | | | 211/41.1 |
| 2016/0111996 A1* | 4/2016 | Stephan | F16B 5/0028 |
| | | | 248/316.6 |
| 2016/0126884 A1* | 5/2016 | Stearns | F24S 25/632 |
| | | | 52/173.3 |

\* cited by examiner

SOLAR PANEL MOUNTING SYSTEM AND METHOD

CROSS-REFERENCE TO RELATED APPLICATIONS

The present application claims the benefit of priority to U.S. Provisional Application No. 62/771,642 filed Nov. 27, 2018, which is incorporated herein by reference in its entirety.

BACKGROUND OF THE INVENTION

The present invention generally relates to solar panel systems, and more particularly to a system and related method for mounting a solar array on a support structure.

The most common method of mounting solar modules (panels) to a support structure such as a rooftop starts with mounting extruded aluminum main runners or rails horizontally across the roof using "L" brackets. The main rails provide the backbone for mounting the individual solar panels to the roof or other support structure. The solar panels, which are typically of rectangular planar construction, are mounted across at least two main rails for support from underneath.

The solar panels are typically secured in position on the main rails via individually packaged loose mounting hardware consisting of several parts which anchor the solar panels to the rails. The hardware typically consists of a bolt, a module clip, a lock washer, and a grounding device. These different parts are usually assembled by hand while on the roof. The bolts are attached to the rails at one end and the module clips at the other end must be "balanced" while the previously installed module clip that is shared between modules is loosened to allow the next module to be slid under the clip. This arduous installation process requires one installer to hold the new module tight to the rail, and another installer to then slide it horizontally to tightly butt into the previous module and align the modules to create an even gap between them. Then, the set of module clips between the previous module and the "new" module are tightened and torqued to specifications. All this requires two installer: one to hold the module tight and aligned, and one to loosen and tighten the clip assemblies. It is easy to accidentally dislodge the clips that are resting on the rail while waiting to be tightened, and it is not uncommon for clips to dislodge. Often the clips slide down the roof slope and lodge themselves under previously installed modules making retrieval difficult, slide into a rain gutter, or fall off the roof entirely. The clips are often lost in shrubbery or lawns, and can damage decks, furniture, or worst case hit someone working or walking below. Accordingly, it is evident that each set of mounting hardware must be typically hand-placed between two adjacent panels to secure them to the rail at once. In short, this is an absurdly inefficient and cumbersome process, requiring additional installers and materials, results in wasted time expended, and creates issues of worker safety.

Also during the foregoing standard process of securing the next adjacent mating panel to the horizontally-oriented support rail, cable management can be problematic. The power and/or any control cables must also be located and connected from beneath the panels. This can be difficult on a pitched "A" frame roof as the panel will want to slide downward due to gravity until the fastener is firmly tightened as explained above. Wire clips must be installed on all panels (e.g. 6-8 per panel typically) in the field during the installation in order to secure the cables to the panel frame. This adds a significant amount of time to the installation as the clips must very tightly grip the panel frame. In addition, the cables remain largely exposed beneath the solar panels after installation creating yet another problem.

Even after the cables are properly secured to the panel frames, a high percentage of post-installation system service calls are due to rodents (e.g. squirrels, rats, mice, etc.) accessing and chewing the exposed field-routed and externally mounted power cable runs. Since these electrical cables can carry currents up to 1000 volts DC, chewed or even just nibbled electrically conductive cabling can be lethal to service personnel if touched. Even with redundancy in electrical grounding of the solar array, the module frames and rails can further become energized by damaged power cables posing danger. Furthermore, the exposed conductive cabling can short and spark causing fires. Finally, if the system is no longer capable of providing electricity, the strings are interrupted and the inverter senses a fault, short or interruption, and turns off instantly, thereby rendering the system non-functional. Because it is impossible to guarantee the wire is not damaged in an area under the array that cannot be seen by visual or video observation, every module must be then tested. This is difficult and dangerous work preformed while on the roof. Every solar module needs to removed, lowered to the ground, inspected, electrical continuity tested, repaired as required, and then lifted back up and reinstalled on the roof.

Improved devices, systems, and methods for mounting solar panels in an array are desired.

SUMMARY OF THE INVENTION

The present invention provides a solar panel mounting system and related method which allows relatively rapid installation of solar panels in a manner which overcomes the deficiencies of the foregoing past installation techniques.

In one embodiment, the mounting system comprises a solar panel comprising a modular peripheral frame of rectilinear configuration defining a perimeter of the panel. The peripheral frame may be comprised of four frame members. This may include extruded primary or basic frame members on three sides of the solar panel and an extruded deformable locking frame member on the remaining fourth side. In one configuration, the basic frame members may be extruded aluminum C-channel sections and the locking frame member may be an extruded aluminum H-channel section. Other metallic and non-metallic materials of construction can be used. Preinstalled in this "H" channel are two captive "T" bolt sets or assemblies comprising a standard nut or optionally a lock nut, and threaded T-bolt with T-shaped head on one end. An optional positive friction patch may be provided on the threads of the bolt shank which frictionally interacts with the threaded nut to conveniently allow the user to rotate the T-bolt between unlocked and locked positions in the horizontal main support rails via turning the nut. When tightening the nut on the T-bolt set, this simultaneously and concomitantly rotates and locks the T-head in a mounting channel of the longitudinally-extending main support rail as the first panel is first loosely fastened down, thereby enabling subsequent insertion of the next adjacent second panel in the horizontal solar panel row or series into an outwardly open cavity of the "H" channel. The T-bolt set is then firmly tightened which deforms the H-shaped locking frame member and clamps down on the peripheral edge or side of the inserted second solar panel to lock it into place. Advantageously, no mounting hardware needs to be manually handled and positioned between the two panels for locking them in place on the main support rails. Also of note, with preinstalled captive hardware, once the T-head of the bolt is set in the mounting channel in the main support rail, the panel is not at risk of sliding down the roof until both panels are securely mounted in the foregoing manner. Furthermore, with captive hardware (T-bolt set), the hardware is not at risk of rolling down the roof. One hand mounting with the T-bolt can take place with a battery powered screw gun or socket driver, or manual regular or socket wrenches as some non-limiting examples.

In the improved solar panel mounting system disclose herein, the conductive cabling is pre-routed through a grommet and inside the solar module frame thereby eliminating the need to find it under the module and use cable clips. This also conceals, protects, and secures the inter-panel wiring/ cable connections away from rodents. A snap-in rodent-proof metal conduit cover on the underside of the solar panel eliminates accessibility to the wiring, conductors junction boxes, and other electrical devices which routes the cables internally within the panel frame away from rodents. The conduit cover is integrated into the solar module frame in one embodiment as further described herein.

The improved new solar panel or module design offers numerous following advantages over the state-of-the-art modules, mounting systems, and panel installation process describe above, including but not limited to: a. installation time may be reduced by up to 30-50%; b. installation materials may be reduced by up to 90%; c. personnel safety and real property safety are significantly improved; d. damage to conductive cabling and the electrical system from rodents may be eliminated; repair costs for system and property may be eliminated; f. income from solar array system "due to down-time" is not diminished and sacrificed; g. in the case of off-grid systems, loss of all electricity to the personal dwelling or business is avoided; h. the present panel mounting system and method will require no additional parts to handle or install, thereby cutting material costs significantly; i. direct grounding to the rails and modules is integral; j. solar panel installation will require only one installer to handle and install each module, thereby cutting labor in half; and k. there are fewer loose mounting hardware parts flying off the roof, fewer tools to carry, and eliminating the potential for "sliding/slipping" modules during installation inherently makes the jobsite exponentially safer.

In one aspect, a solar panel mounting system comprises: a first solar panel comprising a peripheral frame configured for supporting a photovoltaic cell array; the peripheral frame including a plurality of primary frame members and a locking frame member having a deformable clamping portion; a rotatable captive bolt assembly mounted through the locking frame member; the locking frame member configured for slideably receiving a peripheral side edge of an adjacent second solar panel at least partially therein; wherein tightening the captive bolt assembly deforms the clamping portion of the locking frame member and clamps the second solar panel in place. In some embodiments, the captive bolt assembly extends through the clamping portion of the locking frame member.

In another aspect, a solar panel mounting system comprises: a support structure; a pair of main support rails mounted to the support structure, each main support rail including a longitudinal axis and longitudinally-extending fastening channel; a first solar panel disposed on the pair of main support rails, the first solar panel comprising a peripheral frame configured for supporting a photovoltaic cell array; the peripheral frame including locking frame member comprising a deformable clamping portion defining an outward facing cavity configured for slideably receiving a peripheral side edge of an adjacent second solar panel at least partially therein; a pair of captive T-bolt sets mounted to the clamping portion of the locking frame member, each T-bolt set comprising a threaded T-bolt having an elongated locking head and a nut frictionally engaged with the T-bolt such that rotating the nut rotates the T-bolt; the locking heads of the T-bolt sets located in the fastening channels of the main support rails; wherein the T-bolt sets are each rotatable via turning the nut between an unlocked position in which the locking head is not locked in its respective fastening channel, and a locked position in which the locking head is locked in the fastening channel to secure the first solar panel to the main frame rails.

In another aspect, a method for mounting solar panels in an array is disclosed. The method comprises: mounting a pair of main support rails on a support structure in spaced apart relationship; mounting a first solar panel onto the support rails, the first solar panel including a peripheral frame having a locking frame member and a T-bolt assembly comprising a T-bolt extending through a deformable clamping portion of the locking frame member; inserting a peripheral side edge of a second solar panel into an outward facing cavity of the clamping portion of the locking frame member of the first solar panel; and tightening the T-bolt assembly which deforms the clamping portion of the locking frame member and clamps the second solar panel to the first solar panel.

BRIEF DESCRIPTION OF THE DRAWINGS

The features of the exemplary embodiments of the present invention will be described with reference to the following drawings, where like elements are labeled similarly, and in which.

All drawings are schematic and not necessarily to scale. Parts numbered in one figure but appearing un-numbered in another figure are the same parts unless explicitly noted otherwise herein.

DETAILED DESCRIPTION

Figure 1:
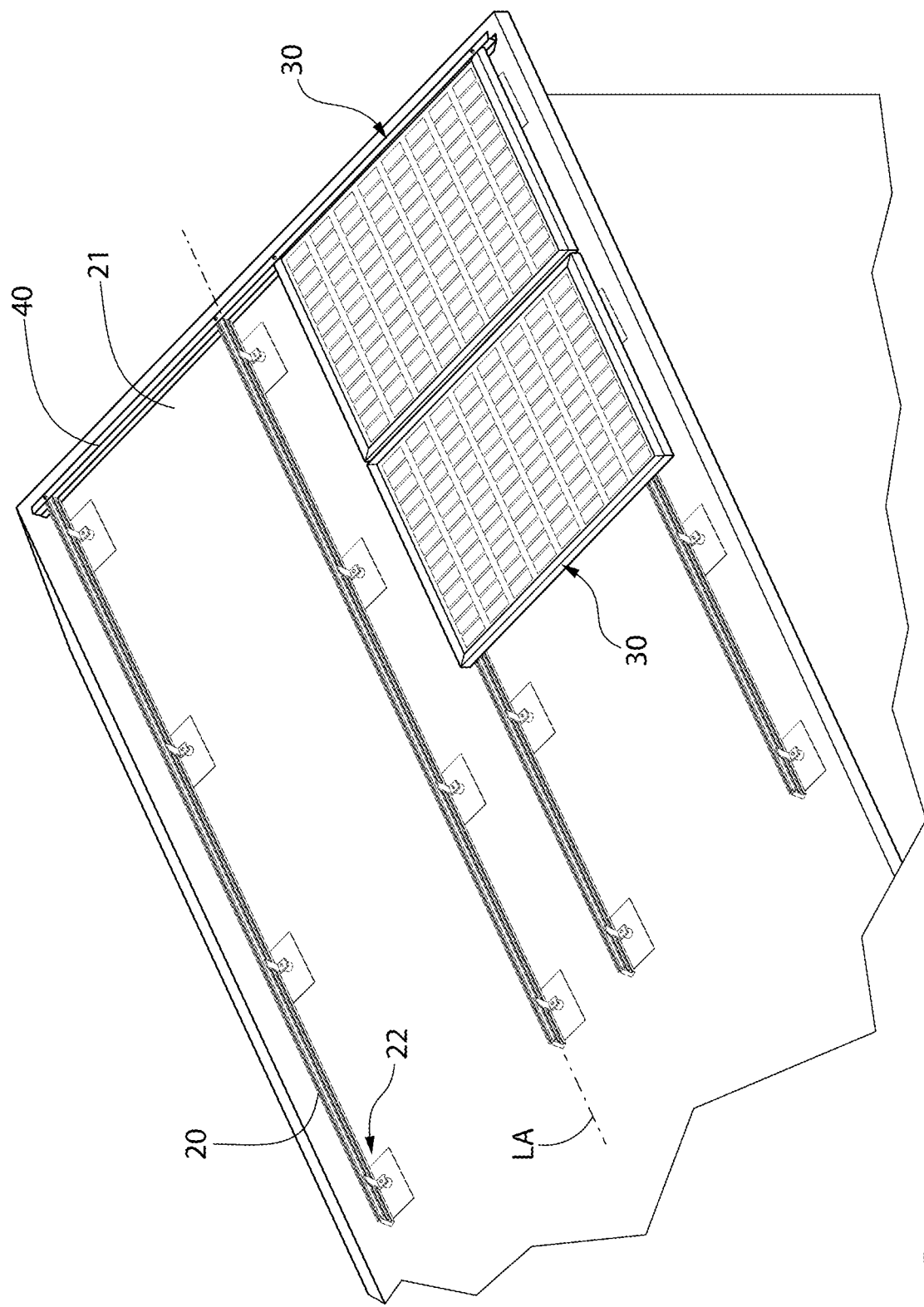
FIG. 1 is a perspective view of a solar panel system for forming a solar array according to the present disclosure.

The features and benefits of the invention are illustrated and described herein by reference to example ("exemplary") embodiments. This description of example embodiments is intended to be read in connection with the accompanying drawings, which are to be considered part of the entire written description. Accordingly, the disclosure expressly should not be limited to such embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," and "interconnected," refer to a relationship wherein structures are secured or attached to one another either directly or indirectly through intervening structures, as well as both movable or rigid attachments or relationships, unless expressly described otherwise.

FIGS. 1-13 depict a solar panel mounting system and its components according to the present disclosure. FIG. 1 is a perspective view of a solar panel mounting system used for mounting a plurality of panels to support structure. The mounting system includes a plurality of horizontally oriented and axially elongated longitudinal main support runners or rails 20. Multiple parallel rows of spaced apart rails may be provided for mounting an array of solar panels 30 thereto in side-by-side series fashion. Multiple parallel horizontal rows of solar panels may be installed in some applications using the main support rails in typical manner for form the array.

The main support rails 20 each define a respective longitudinal axis LA and corresponding axial directions for convenience of reference. Rails 20 are attached to a support structure on which the solar panels 30 are to be mounted, such as a building roof 21. The roof may be a pitched roof such as an A-frame inclined to horizontal as illustrated, or a flat roof. In other possible embodiments, the main support rails 20 may be attached to a frame mounted at ground level from grade, or other types of grade-level or elevated support structures used in a solar panel array. Accordingly, the present invention is not limited in its applicability to roof mounted installations alone and may be used with equal benefit in various different solar panel mounting situations.

Figure 2:
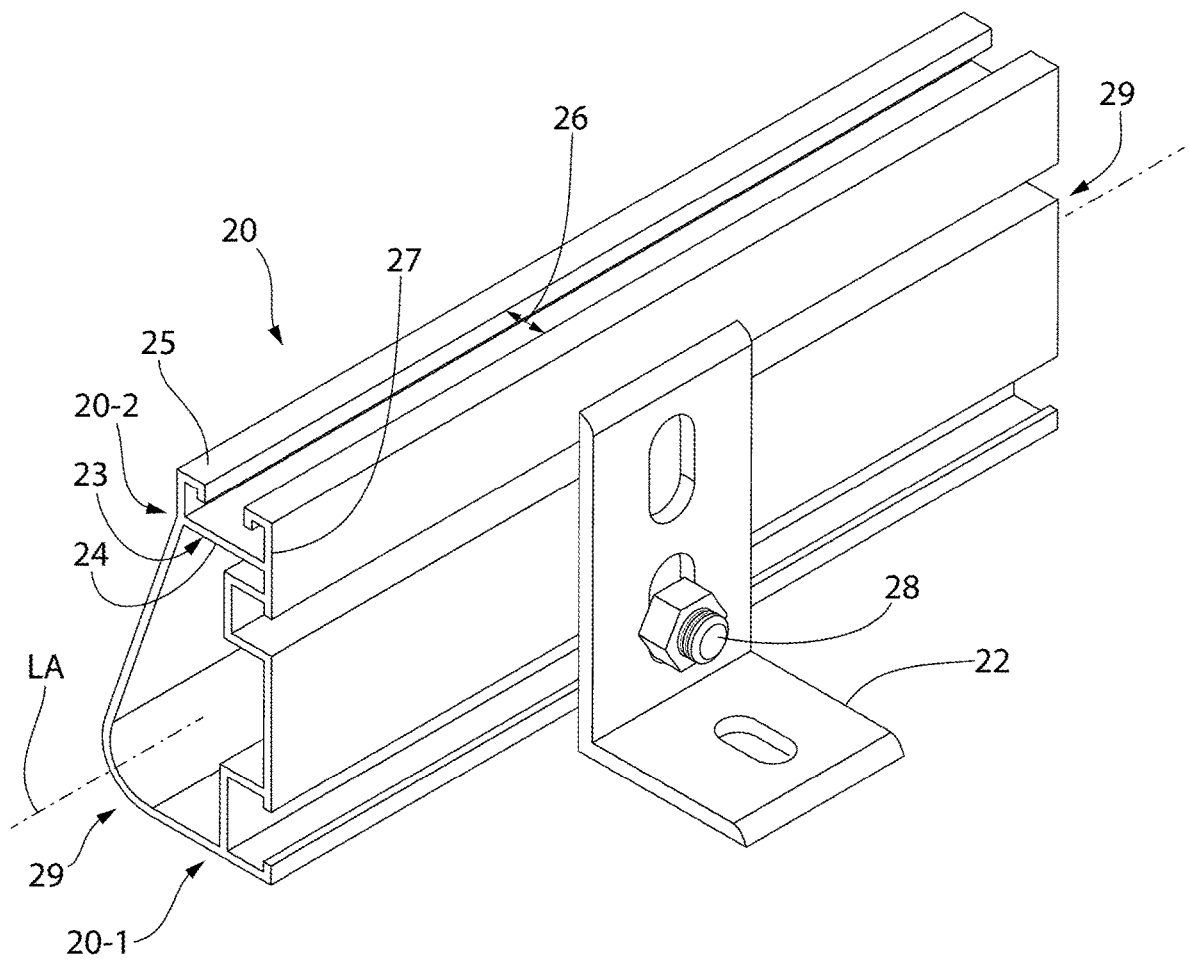
FIG. 2 is a perspective view of longitudinal main support rail of the system of FIG. 1 configured for mounting to a support surface such as a roof.

FIG. 2 is an perspective end view of one non-limiting embodiment of a main support rail 20 usable for mounting solar panels. Any suitable configuration of a support rail may be used for this purpose. The support rail 20 may be coupled to the roof 21 via suitable brackets, such as L-shaped brackets 22 and fasteners 28 (e.g. threaded bolt-nut sets) which are commonly used for this purpose in the art. The support rails 20 each include a lower base portion 20-1 for engaging the roof or spacer structure between the rail and roof to raise the rails above the roof tiles or shingles for proper drainage, and an upper panel mounting portion 20-2 configured for coupling the solar panels 30 thereto.

The upper panel mounting portions of main support rails 20 each comprise a longitudinally-extending internal fastening channel 23 formed immediately adjacent to the top of the rail. Channels 23 are each defined by a horizontal closed or solid bottom wall 24, partially open top wall 25, and pair of solid lateral sidewalls 27 extending between the top and bottom walls. The top wall 25 defines an upwardly open and longitudinally-extending mounting slot 26 configured for inserting the head of a panel mounting fastener therethrough slot into the channel 23. The opposing ends 29 of the channels 23 may be open in one embodiment or closed such as via a permanent or removable end cap. The channel 23 may have a rectangular configuration in transverse cross section as shown, or other suitable cross-sectional shape. In one embodiment, the main support rails 20 may be formed of an extruded metallic material, such as aluminum or other metallic materials. Other configurations of main support rails may be used and does not limit the invention.

Figure 3:
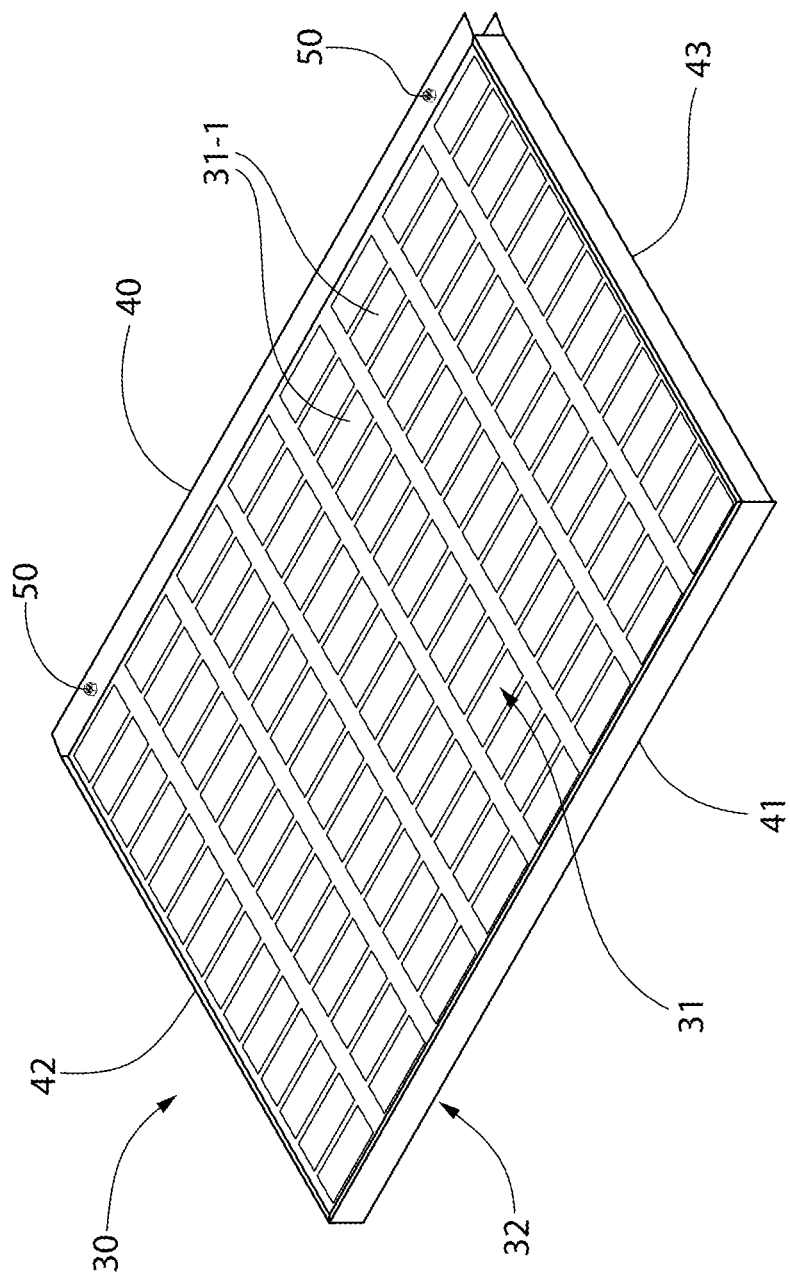
FIG. 3 is a perspective view a solar panel with peripheral frame and photovoltaic cell array.
Figure 4:
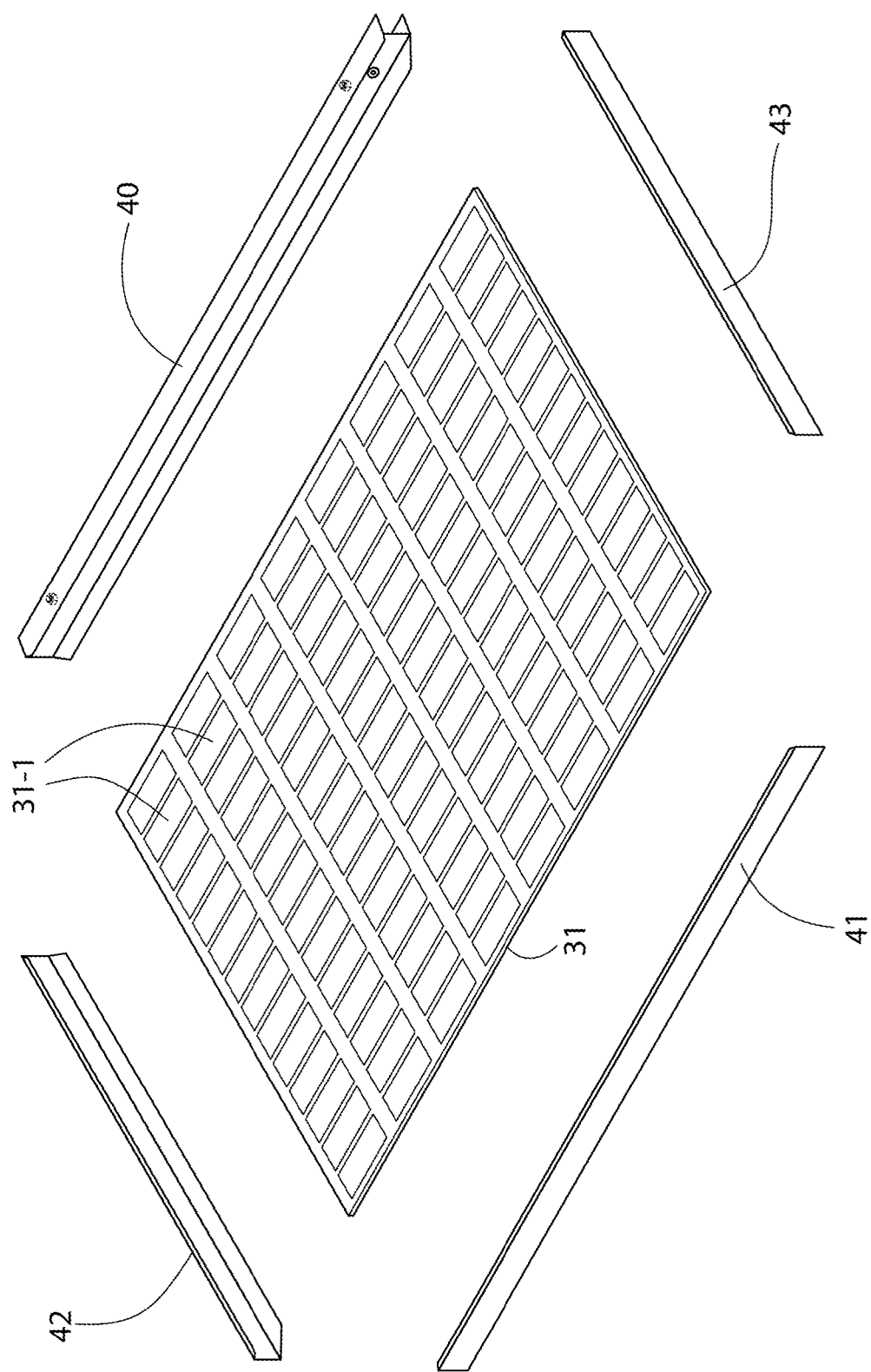
FIG. 4 is an exploded view thereof.

FIGS. 3 and 4 show assembled and exploded views respectively of a rectilinear solar panel 30 having a unique frame construction according to the present disclosure. FIGS. 5-8 show additional details of the peripheral frame, mounting hardware, and main support rails.

Referring to FIGS. 1-8, solar panel 30 may have a generally planar/flat square or more commonly a rectangular configuration. Solar panel 30 includes an interior photovoltaic cell array 31 comprising a plurality of photovoltaic solar cells 31-1. This forms the active solar energy absorbing portion or region of the panel which converts solar energy into electricity.

The photovoltaic cell array 31 may have any type of composite construction which may include encapsulation of the solar cells between protective layers such as transparent glass or plastic on the top and bottom of the cells, a sheet of top cover glass for protection from the elements or debris, a backing sheet on the bottom of the panel for additional support, and other elements. Numerous variations of the cell array construction are possible and well known in the art without further undue elaboration. The photovoltaic cell array construction is not limiting of the present invention.

The solar panels 30 each include a peripheral frame 32 which defines a rectilinear perimeter of the assembly panel. Peripheral frame 32 is formed by a plurality of orthogonally arranged and perimetrically extending frame members. The frame members include a first pair of opposing right and left frame members 40, 41 and a second pair of opposing top and bottom frame members 42, 43 arranged perpendicularly to the first pair. Each of the frame members are linearly elongated in shape. Adjacent frame members are oriented perpendicularly to each other at the corners of the solar panel.

The three frame members 41-43 may be considered first basic or primary frame elements that may be formed by structural C-channels in transverse cross sectional shape in one embodiment. Each C-channel defines an inwardly and laterally open cavity 44 for receiving and retaining the peripheral sides of the photovoltaic cell array therein. Cavity 44 is formed by orthogonally intersecting horizontal top flange or wall 44-1, horizontal opposing bottom flange or wall 44-2, and vertical sidewall 44-3 of each C-channel extending therebetween (orientations assuming the panel is in a horizontal or angled position for convenience of reference). The outward facing surface or side 47 of the sidewalls 44-3 of frame members 41-43 opposite cavity 44 may be generally plain and flat without any cavity (see, e.g. FIG. 7), and oriented vertically in one embodiment (assuming the panel is in a horizontal or angled position for convenience of reference). Bottom wall 44-2 may be laterally elongated and wider than top wall 44-1 to provide extra support for the solar array. Top wall 44-1 is preferably laterally narrower by contrast to maximize the surface area available for absorbing solar radiation.

The remaining fourth frame member 40 (right side) is configured differently for coupling an adjacent solar panel 30 thereto. In one embodiment, frame member 40 may be a deformable locking frame member formed of a structural H-channel in transverse cross sectional shape defining both an inwardly and laterally open inner cavity 45 and an opposite outwardly and laterally open outer cavity 46 (see, e.g. FIG. 7). Cavity 45 receives the remaining peripheral side edge of the photovoltaic cell array therein. The outwardly open cavity 46 is configured for receiving a peripheral side edge of one of the C-shaped side frame members of an adjacent solar panel 30 at least partially therein (e.g. left frame member 41 in FIG. 3 in this example). Cavities 45 and 46 are formed by orthogonally intersecting horizontal top flange or wall 45-1, horizontal opposing bottom flange or wall 45-2, and vertical wall or web 45-3 of each H-channel extending therebetween (orientations assuming the panel is in a horizontal or angled position for convenience of reference). Bottom wall 45-2 may be laterally elongated and wider than top wall 45-1 to provide extra support for the solar array. Top wall 45-1 is laterally narrower by contrast to maximize the surface area available for absorbing solar radiation.

The portion of locking frame member 40 which defines the outwardly open cavity 46 forms the deformable and compressible "clamping portion" of the member which produces a clamping action onto an adjacent second solar panel when mounted to the first solar panel. Tightening the captive T-bolt sets 50 further described herein deforms and compresses the top and bottom walls 45-1, 45-2 together against the second solar panel. This firmly clamps and locks the peripheral side edge of the second solar panel in the outwardly open cavity 46 which may be considered to define a "locking cavity." It bears noting that the secure engagement between the clamping portion of locking frame member 40 and the second solar panel is important to provide a stable solar panel mounting system which can resist wind loadings imposed on the solar array. The wind loading and forces may be significant particularly if the solar array is to be mounted on the roof of a building and at an angle.

In some preferred but non-limiting embodiments, the H-shaped deformable locking frame member 40 may have a stepped shape in transverse cross section. The opposing top and bottom walls 45-1, 45-2 of locking frame member 40 may each comprise a step-shaped transition 45-4 between inner portions and outer portions of the walls. The inner and outer portions are defined with respect to the vertical web 45-3 of the frame member 40 (i.e. the outer portion is outboard of the sidewall and the inner portion is inboard of the sidewall). The vertical distance D1 between the top and bottom walls 45-1, 45-2 of the outer portion is greater than the vertical distance D2 between the top and bottom walls 45-1, 45-2 of the inner portion. The outwardly open outer cavity 46 of locking frame member 40 in this embodiment thus has a greater height (corresponding to D2) than the height of inwardly open inner cavity 45 (corresponding to D1). This serves two important functions. First, the vertically shorter inner cavity 45 needs to be narrower and preferably has the same relative height as the inward facing cavities 44 of the C-channel shaped frame members 41-43 for receiving the peripheral edges of photovoltaic cell array 31 therein. Conversely, the vertically taller out cavity 46 must be larger to receive the left frame member 41 as noted above which has a greater vertical height than the height/thickness of the photovoltaic cell array 31. The step-shaped transitions 45-4 of locking frame member 40 therefore makes possible the different height requirements of the inner and outer cavities 45, 46. It bears noting that the photovoltaic cell array 31 may have a height/thickness substantially less than the inner cavity 45 to permit routing of the control/electrical cabling thereunder, as further described herein.

In one embodiment, the frame members 40-43 may be formed of extruded aluminum or another suitable preferably metallic material. Non-metallic materials such as fiber reinforced plastic (FRP) may alternatively be used. Accordingly, the frame material does not limit the invention. All frame members may be mounted and assembled to the photovoltaic cell array 31 in the shop prior to shipment to the jobsite, thereby providing a complete solar panel for shipment and handling. Any suitable method may be used for securing the frame members together. In some non-limiting examples, the frame may be welded together or assembled via a suitable adhesive such as adhesive silicone (RTV) as some non-limiting examples.

It bears noting that although the locking frame member 40 is described above for convenience of description only as being the right frame member of the solar panel frame, the locking frame member may become the left frame member if desired by simply rotating the panel 180 degrees. Whether the locking frame member 40 is located on the right or left side of the panel depends on the direction from which the solar panels will be coupled together (i.e. starting from left to right or right to left as shown in FIG. 1) since the next adjacent panel in the array to be placed on the support rails 20 is slideably inserted partially into the locking frame member 40 of previously placed panel as described above. Preferably, the H-shaped locking frame member 40 is located on the side of the solar panel facing laterally outwards to receive and lock the C-shaped frame member of the next panel thereto. Accordingly, the use of the foregoing "left" and "right" terminology is therefore for convenience of description only and not limiting of the invention in any way.

Figure 5:
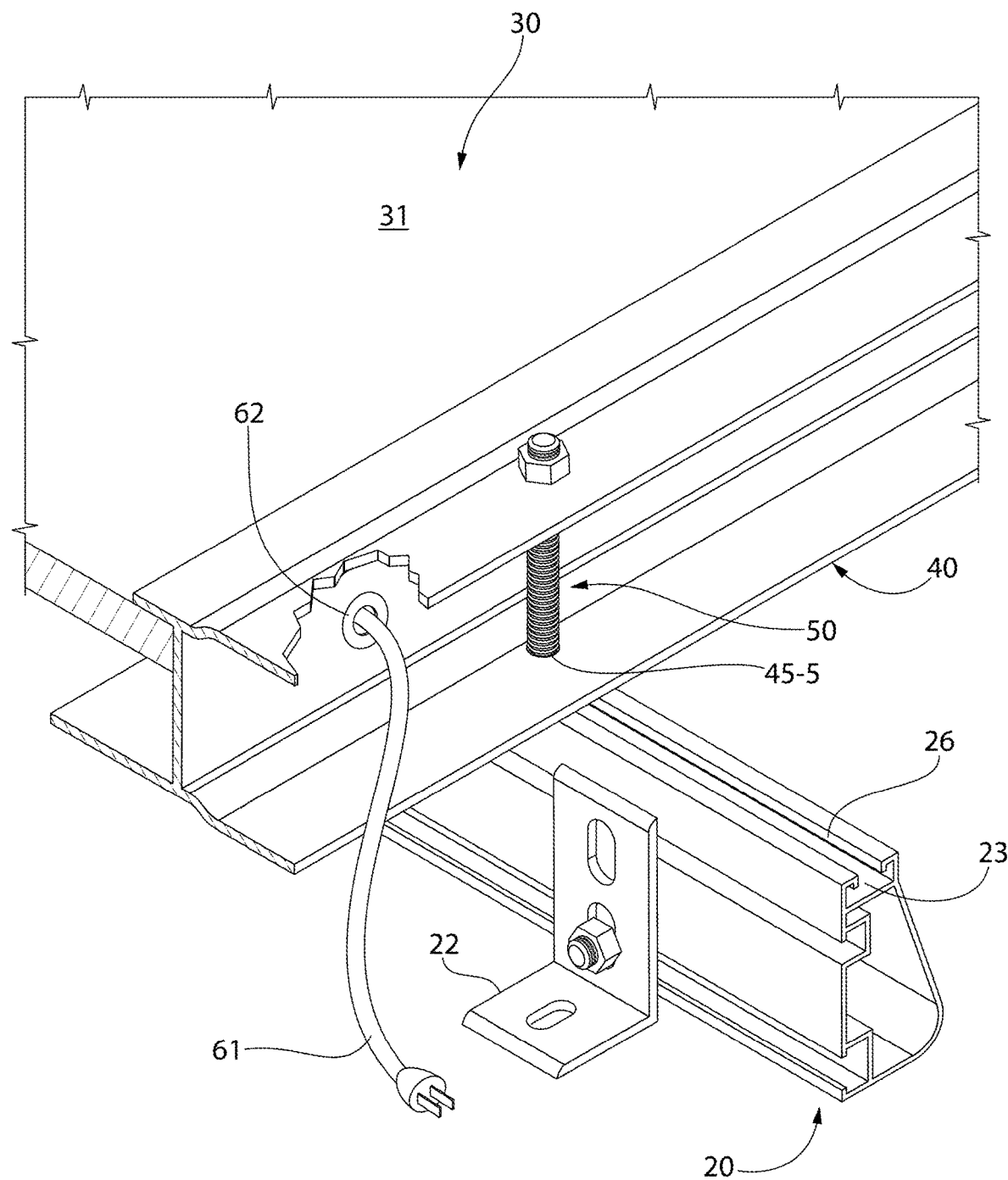
FIG. 5 is a perspective view of a portion of the solar panel mounted to the main support rail.
Figure 6A:
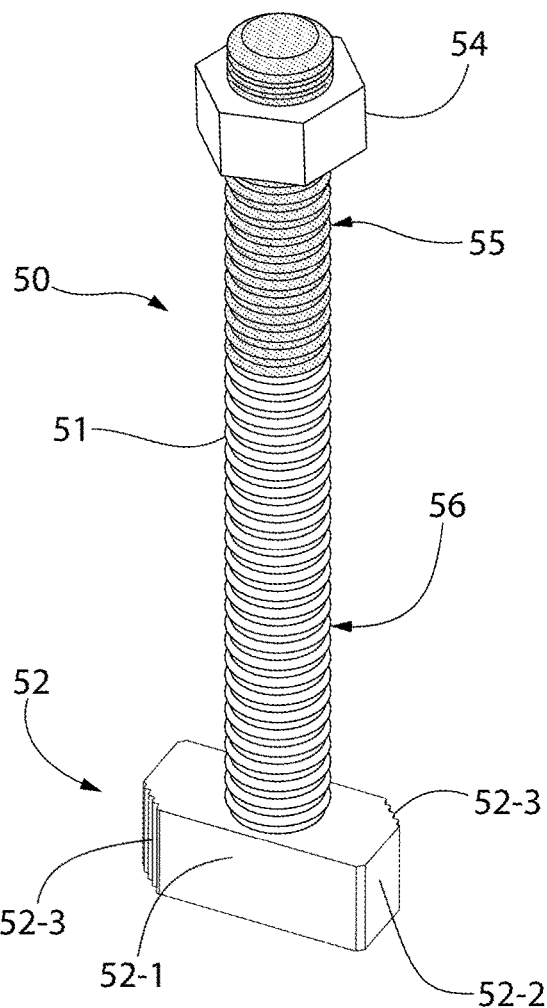
FIG. 6A is a perspective view of a captive locking T-bolt assembly or set for securing the solar panel to the main support rail and interlocking an adjoining new solar panel to a previously installed panel.
Figure 13:
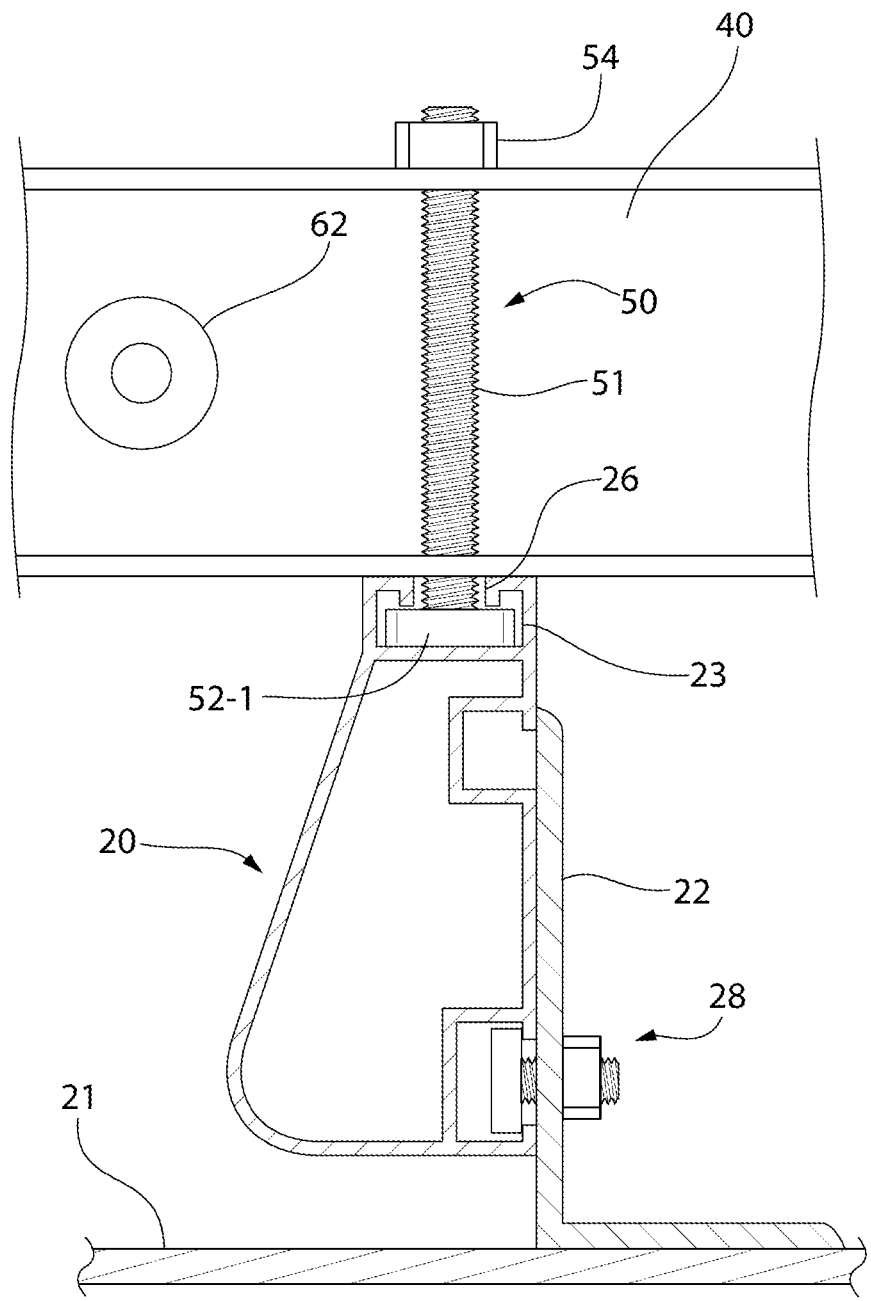
FIG. 13 is a side view showing a locking frame member of the solar panel peripheral frame fully mounted to a main support rail.

According to another advantageous aspect of the invention, the present peripheral frame includes a captive T-bolt assembly 50 for securing the solar panel 30 to the main support rails 20 and forming an interlock with adjacent panels during installation of the solar array. FIG. 6 shows an example of captive T-bolt assembly prior to mounting to the solar panel frame. FIGS. 5, 7, and 13 show the T-bolt assembly after pre-mounting to the peripheral frame preferably in the shop before shipment to the jobsite for ease of panel installation and to prevent having to manually handle the hardware. The pre-mounted captive bolt assembly advantageously provides accurate and pre-set spacing between the modules, thereby eliminating the need for panel-to-panel spacing adjustment and alignment in the field per previous installation systems. Alternatively, however, it is still possible to couple the T-bolt assembly 50 to the locking frame member 40 in the field if necessary or desired for some reason as an alternative.

With continuing reference to FIG. 6, T-bolt assembly 50 includes a T-bolt 51 comprising a T-shaped locking head 52 on one end of the shank 56 and an opposite threaded end 53 of the shank, and a threaded nut 54 rotatably coupled to the threaded end. The threads may be formed on only the end portion of the shank proximate to end 53, or the entire shank may but need not be threaded in other embodiments as shown. Any suitable threaded conventional or lock nut may be used. The head 52 may be rectangular and elongated in shape including two opposite short ends or sides 52-2 and two opposite long sides 52-1 as illustrated. A pair of locking corners 52-3 of the head are formed at two diagonally opposite corners of the head 52. The locking corners 52-3 may be angle chamfered in some embodiments as shown to facilitate both rotating the T-head once inside the fastening channel 23 of the main support rails 20, and importantly to enhance and optimize both locking frictional engagement with the opposing longitudinally-extending lateral sidewalls 27 of the channel and electrical grounding of the locking frame member 40.

The angle chamfered locking corners 52-3 of T-bolt head 52 each define a substantially linear or straight surface or face lying in a locking plane Lp which is obliquely angled (e.g. about 30-60 degrees) to the adjacent short sides 52-2 and long sides 52-1 that meet at the corner. The T-bolt head 51 is dimensioned and angle of chamfered locking corners 52-3 are selected such that a substantially flat-to-flat interface is created between the locking corners and lateral sidewalls 27 of channel 23 for optimum frictional engagement. In some embodiments, the corners 52-3 may have a textured surface such as serrated (shown), knurled, or other to increase frictional engagement between the locking corners and sides of the frame channel 23. In one embodiment, a serrated surface is preferred for positive electrical grounding between the solar panel 30 and the longitudinal main support rails 20 via the T-bolt assemblies 50. Advantageously, this can eliminate or minimize any additional provisions necessary for grounding the panels to the rails.

It bears noting that in contrast to typical square corner which optionally may be provided and used on T-bolt head 52, the diagonally opposed pair of angle chamfered locking corners 52-3 allows the T-bolt to be rotated farther without interference from square corners which advantageously increases securement of the T-bolt in the fastening channel 23 of the main support rails 20.

Figure 6B:
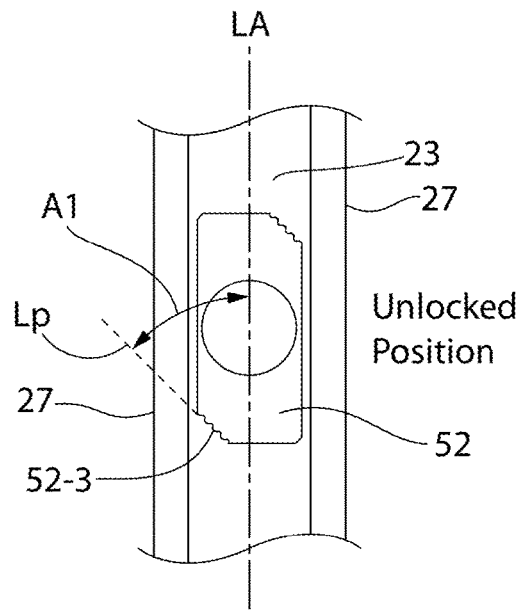
FIG. 6B is a plan view showing the locking head of the T-bolt in an unlocked position of the T-bolt assembly in the main support rail.
Figure 6C:
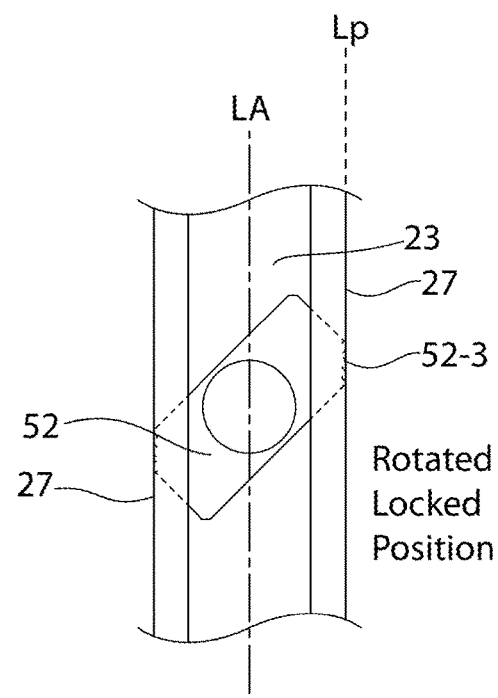
FIG. 6C is a plan view showing a locked position thereof.
Figure 7:
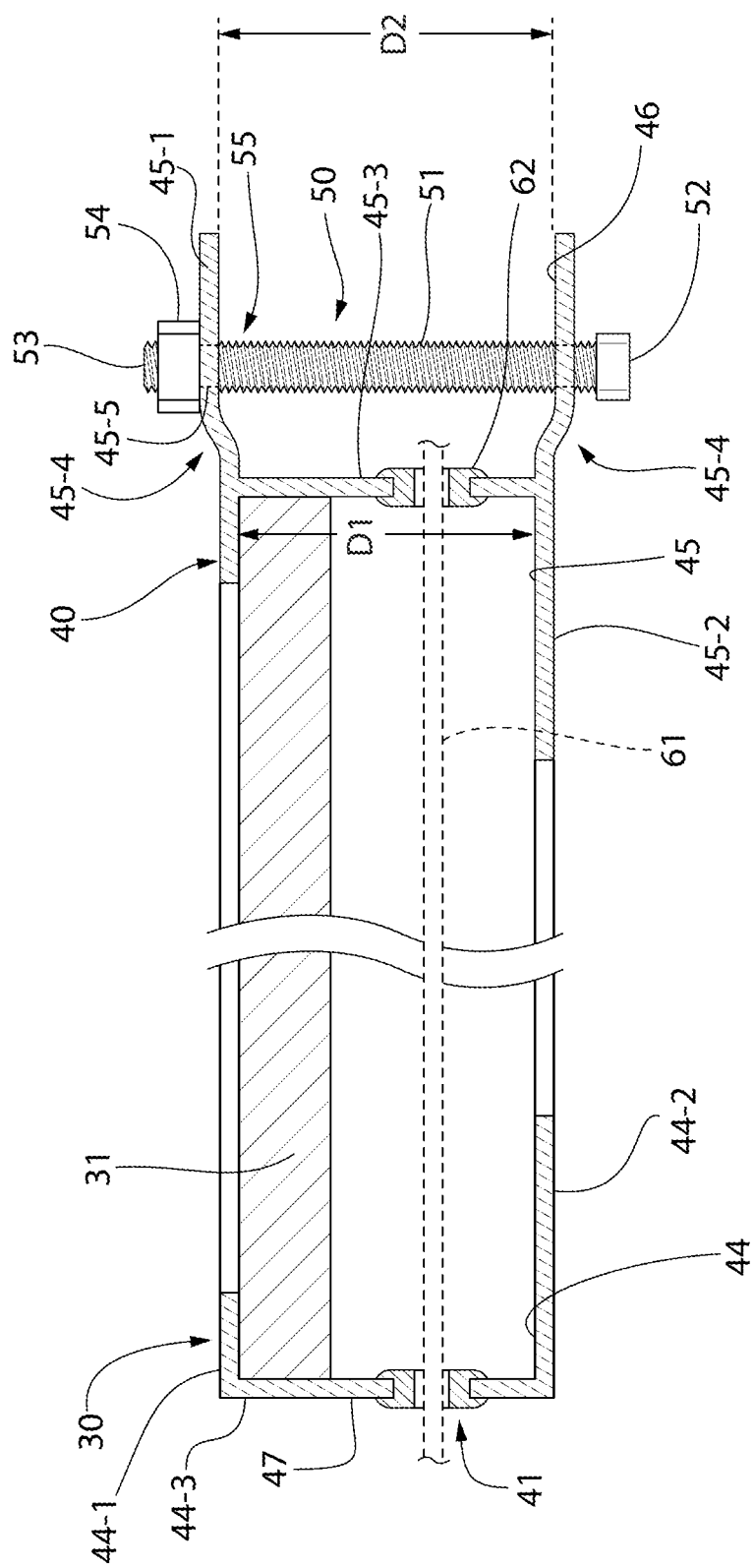
FIG. 7 is a side cross-sectional view of a solar panel.

The T-bolt assemblies 50 (i.e. T-bolt 51) are each rotatable between an unlocked position shown in FIG. 6B, and a locked position shown in FIG. 6C. To accomplish this, the T-shaped head 52 of T-bolt 51 and each fastening channel 23 of main support rails 20 are cooperatively configured and dimensioned to allow the head of the T-bolt to be partially but preferably not fully rotated inside the channel to engage its lateral sidewalls 27 for locking the T-bolt in place. Similarly, the longitudinal mounting slot 26 in the main support rail 20 which opens downwards into channel 23 is configured and dimensioned in lateral width (i.e. measured transversely and perpendicularly to longitudinal axis LA) to allow insertion of the T-shaped head 52 of the T-bolt through the slot into the channel when the long sides of the T-shaped head are oriented parallel to the longitudinal axis LA (see, e.g. FIG. 6B). When the T-shaped head of the T-bolt is rotated to the locked position (FIG. 6C) so that the long sides of the head are oriented obliquely or perpendicularly to the longitudinal axis LA, the head which is longer than wide is preferably prevented from being vertically withdrawn through the slot 26 from the fastening channel 23 of the main support rail 20 by the top wall 25 segments on each side of slot 26. This arrangement allows the T-bolt assembly 50 to be tightened for securing and locking the solar panels 30 to the main support rails 20, as further described herein.

In one embodiment, the fastening channel 23 of main support rail 20 may have a lateral width (i.e. measured transversely to longitudinal axis LA) which is less than the length of the T-bolt head 52 measured parallel along the long sides between the ends defining the short sides 52-2 of the head (i.e. length from short side to short side). When the T-bolt head is positioned in the channel 23 with the long sides oriented parallel to the longitudinal axis LA of the main support rail 20, rotating the bolt 51 to the locked position will engage the sidewalls 27 of the channel 23 with the chamfered locking corners 52-3 and prevent further rotation when the head 52 is oriented obliquely to the longitudinal axis (e.g. between about 30 and 60 degrees in some cases, or about 45 degrees in one embodiment). This is the locked position of the T-bolt, versus the unlocked position when the T-bolt head long sides are parallel to longitudinal axis LA and insertable through mounting slot 26 of the rail 20. Engagement between the locking corners 52-3 of T-bolt head 52 and sidewalls 27 of channel 23 is substantially one of a flat-to-flat interface as shown in FIG. 6C.

In the unlocked position of the T-bolt assemblies 50 (i.e. T-bolt 51), the locking planes Lp defined by the angle chamfered locking corners 52-3 of each T-bolt head 52 are oriented at an oblique angle A1 to the longitudinal axis La of the main support rails 20 (see, e.g. FIG. 6B). In the locked position of the T-bolts assemblies, the locking plane Lp by contrast are oriented parallel to the longitudinal axis LA of the rails 20 (see, e.g. FIG. 6C).

Advantageously, the "captive" T-bolt assembly 50 is pre-installed on the H-shaped locking frame member 40 of the peripheral frame 32 in one preferred embodiment. As previously noted, this prevents having to handle loose solar panel/module mounting hardware (e.g. bolts, clips, washers, and nuts used in prior panel systems) in the field, thereby expediting the solar panel mounting process and preventing the hardware from being dropped and falling beneath other panels or off the roof.

To provide "captive" pre-mounted T-bolt assemblies 50 preferably mounted to the locking frame members 40 of the solar panel peripheral frame in the fabrication shop before shipping to the job site, mounting holes 45-5 (see, e.g. FIGS. 5 and 8) are provided in the parallel top and bottom flanges or walls 45-1, 45-2 of frame member 40 which receive the at least partially threaded shank of the T-bolt 51 therethrough. Preferably, the T-bolt is mounted through holes 45-5 which are located in the outer clamping portion of the flanges or walls 45-1, 45-2 bounding the outward facing cavity 46 of each locking frame member 40. To provide maximum insertion depth of the adjacent solar panel into the cavity 46, the T-bolt assembly 50 may be mounted more proximally towards the central vertical web 45-3 of frame member 40 than the outer peripheral free edges of the flanges. In some installation approaches if not shop-mounted, the locking T-bolt assemblies may be coupled to the clamping portion of the locking frame member 40 on the ground before lifting each solar panel onto the roof.

It bears noting that one skilled in the art will clearly understand that the term "captive" is used herein to connote that the locking T-bolt assemblies are captured by and extend directly through a portion of the locking frame members 40 via mounting holes 45-5 cited above. In prior solar panel mounting approaches previously described in the "Background," bolt assemblies were placed between adjacent panels but did not penetrate the peripheral frame members of the panels, thereby resulting in the myriad of problems noted before.

In the preferred installed position shown in FIGS. 7 and 8, the T-shaped head 52 is located below the bottom flange or wall 45-2 of locking frame member 40, the shank 56 extends upwards therefrom through the outward facing cavity 46, and the threaded end 53 of the shank protrudes upwards beyond the top flange or wall 45-1. The nut 54 is loosely threaded onto this upper exposed threaded end of the shank 56 until tightened later during the solar panel installation process.

In a preferred embodiment, the solar panel 30 may included two spaced apart captive T-bolt assemblies 50 pre-installed on the peripheral frame of the panel since each panel is normally supported by two vertically spaced apart main support rails 20. More or less numbers of T-bolt assemblies may be provided to meet the needs of a particular installation.

In some embodiments, a nylon torque patch 55 may be permanently bonded onto a select upper portion of the threaded end 53 of the shank of the T-bolt 51. The torque patch creates frictional resistance between the nut 54 and shank threads 53, such that rotating the nut will cause the entire T-bolt to rotate concurrently therewith as long as the T-bolt head is free to rotate. This is somewhat analogous to resistance created by a nylon locknut, which in some alternative embodiments may be used in lieu of the torque patch. The nylon torque patch makes it convenient for rotating the head of the T-bolt from the unlocked to locked positon with one hand after head 52 is located within the rail fastening channel 23 described herein during the solar panel mounting process. Once the T-bolt head is positively engaged with the sidewalls of the rail fastening channel 23 in the locked position and cannot rotate freely any further, continued rotation of the bolt will now tighten the entire T-bolt assembly 50 causing the nut to travel downward on the threaded end 53 of the T-bolt. The torque patch also ensures the T-bolt head is properly longitudinally aligned with the mounting slot 26 of the main support rail 20 when being initially inserted into the fastening channel 23. In addition, the torque patch 55 ensures that the nut 54 does not come loose from the T-bolt 51 during shipping and handling prior to installation of the solar panels. A non-limiting example of a suitable commercially available torque patch which may be used is Nylok® Blue Nylon Torq-Patch® Tuflok®.

A method for installing a solar panel system with solar panels 30 to form a solar array will now be briefly described using the solar panel frame construction and mounting hardware according to the present disclosure. FIGS. 8-11 show sequential views in the process of coupling an adjacent second solar panel 30 to a first solar panel 30, which are referenced below.

Figure 8:
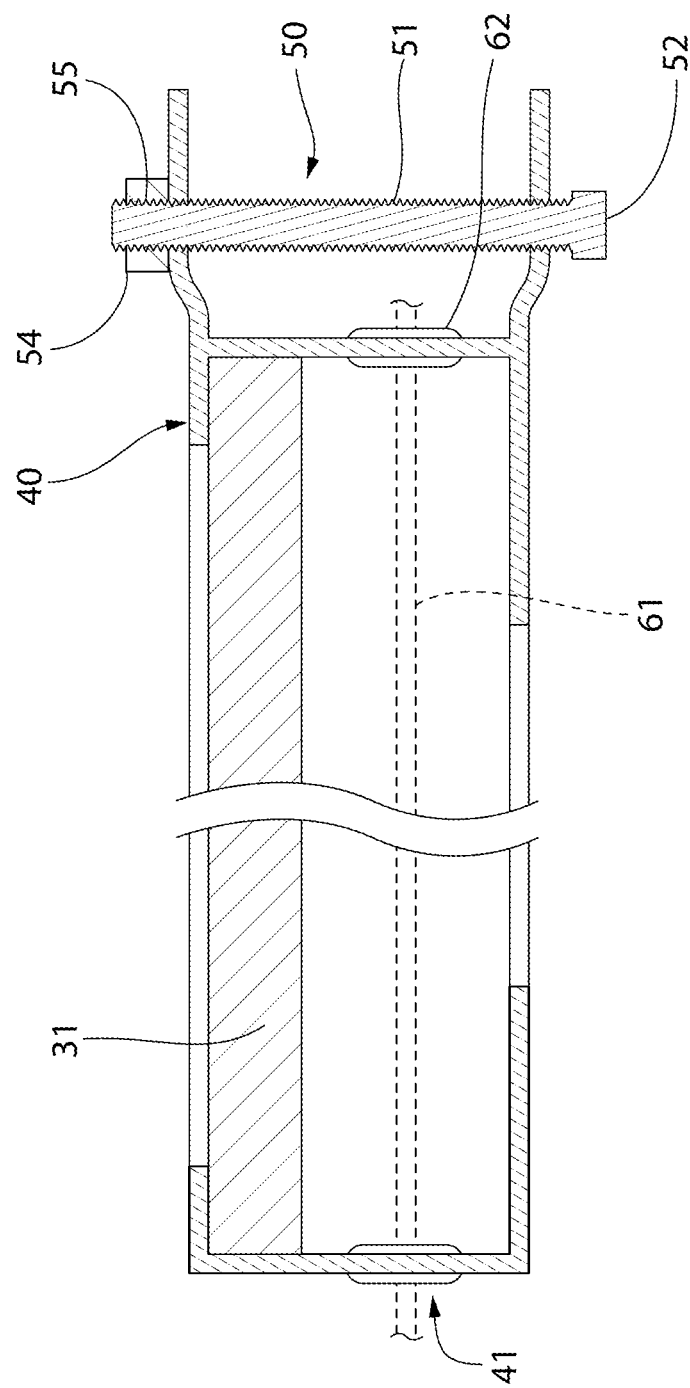
FIGS. 8-11 are sequential cross-sectional views of the solar panel showing a process for mounting and securing a new solar panel to a previously installed panel, with FIG. 8 showing a first step in the process, FIG. 9 showing a second step in the process, FIG. 10 showing a third step in the process, and FIG. 11 showing a fourth step in the process.

A first solar panel 30 with pre-installed "captive" T-bolt assemblies 50 in the peripheral frame 32 is provided (FIG. 8). The method includes mounting at least one main support rail 20 on a support structure such as a roof 21 or other support structure transversely and perpendicularly to the longitudinal axis A of the rail (see, e.g. FIGS. 1 and 5). Preferably, at least two main support rails 20 are mounted and run horizontally/laterally in parallel spaced apart relationship.

A starter channel, which may be a loose one of the locking frame members 40 with H-channel configuration, may first be placed transversely/perpendicularly across the pair of rails 20 and mounted thereto as shown in FIG. 1. The starter locking frame member 40 may be removably coupled to the pair of main support rails 20 using the T-bolt assemblies 50 in the same manner to be described below for the locking frame members 40 which are part of the solar panel peripheral frame 32. This process will therefore not be described here at present for the starter rail, recognizing that the mounting procedure for the starter locking frame member 40 is the same. The starter locking frame member 40 may have a length which exceeds the length of those on the peripheral frame, and in some embodiments may span transversely across more than a single pair of main support rails 20 as seen in FIG. 1.

After mounting the starter locking frame member 40 to the main support rails, the method continues and further includes placing the first solar panel 30 against and onto the pair of main support rails 20. Preferably, the first solar panel is oriented so that the outward facing outer cavity 46 of H-shaped frame member 40 is facing horizontally/laterally.

The method continues by inserting the elongated locking head 52 of each T-bolt 51 (which is exposed on the bottom of the peripheral frame 32) vertically through the top mounting slot 26 in the main support rails 20 and into fastening channels 23 of the rails. This may occur concurrently during and as part of the prior placing step above. The elongated locking head 52 of each bolt is aligned with its long sides 52-1 oriented and aligned parallel to rail fastening channel 23 along the longitudinal axis LA of the rail 20 and lengthwise with the mounting slot 26 during the insertion step. Accordingly, the T-bolt assemblies 50 are in the "unlocked" position during the insertion step in which the locking planes Lp defined by the angle chamfered locking corners 52-3 of each T-bolt head 52 are oriented at an oblique angle A1 to the longitudinal axis LA of the main support rails 20 (see, e.g. FIG. 6B).

The first solar panel 30 may be adjusted in lateral/horizontal position on the rails as needed to insert the lateral C-shaped frame member 41 opposite the locking frame member 40 on the panel into the awaiting outward facing outer cavity 46 of H-shaped frame member 40 of the starter locking frame member 40 which was previously mounted to the pair of main support rails 20.

The method further continues and includes rotating each T-bolt 51 until the long sides of the T-bolt head 52 are no longer parallel to the rail longitudinal axis or mounting slot 26 (e.g. obliquely or perpendicularly angled thereto) and in the T-bolt assemblies 50 are in "locked" position. The locking planes Lp by contrast are now oriented parallel to the longitudinal axis LA of the main support rails 20 (see, e.g. FIG. 6C). This prevents the T-bolt head from being withdrawn upwards through the slot 26 associated with the fastener channel 23 of the rails 20. In some embodiments, this step may be performed by simply rotating the nut 54, which will concomitantly rotate the T-bolt when a friction patch 55 is added to the threads of the T-bolt as previously described herein (or alternatively a nylon lock nut). It bears noting that the nut need not be rotated to an extent which fully tightens the T-bolt assembly 50. Accordingly, the T-bolt assembly 50 may still be in a somewhat slightly loosened condition at this point in the installation process and is slideable laterally/horizontally in the fastening channels 23 along the rails 20 with the solar panel 30 even while the T-bolt assembly is in the loosely locked position. This permits the lateral/horizontal adjustment of the first solar panel 30 on the rails 20.

It further bears particular noting that once the T-bolt head 52 has been inserted into the fastening channel 23 of the support rail 20, the solar panel 30 advantageously will be automatically held temporarily in positon and prevented from sliding vertically down the roof relative to the support rails 201 even though the T-bolt assembly has not been fully tightened to any significant degree with the assemblies in the locked rotational position. This is particularly significant for an angled/sloped roof installation. With the T-bolt assemblies 50 in the loosely locked position, wind gusts which may work their way beneath the solar panel 30 will be prevented from lifting the panels off of the main support rails 20 adding to the safety of the installer.

It bears noting that insertion of the T-bolt heads 52 into the rails even while the T-bolt assemblies 50 may be in the unlocked position of the T-bolt assemblies described above still prevents the solar panels 30 from sliding downwards across the rails 20 and roof. Either the locked or unlocked scenarios of the T-bolt assemblies advantageously therefore provides significant installation flexibility and advantages by eliminating the past problem of juggling with the mounting hardware until the bolt assembly and clamp/washer have been securely tightened against a pair of adjacent solar panels as previously described herein. A single installer may handle, place, and mount the solar panel in lieu of at least two installations as used in past panel mounting approaches described heretofore. In addition, the solar panel 30 may be slid horizontally along the rails to adjust the desired position on the rail or to make electrical connections.

Once the solar panel is in the desired position on the pair of main support rails 20, the T-bolts may then be rotated via turning the nuts 54 on exposed top of the first solar panel 30 which are tightened to a first degree sufficient to positively lock the T-bolt head in the fastening channel 23 of the rail 20 without preferably substantially deforming the clamping portion of the locking frame member 40 on the peripheral frame 32.

Figure 9:
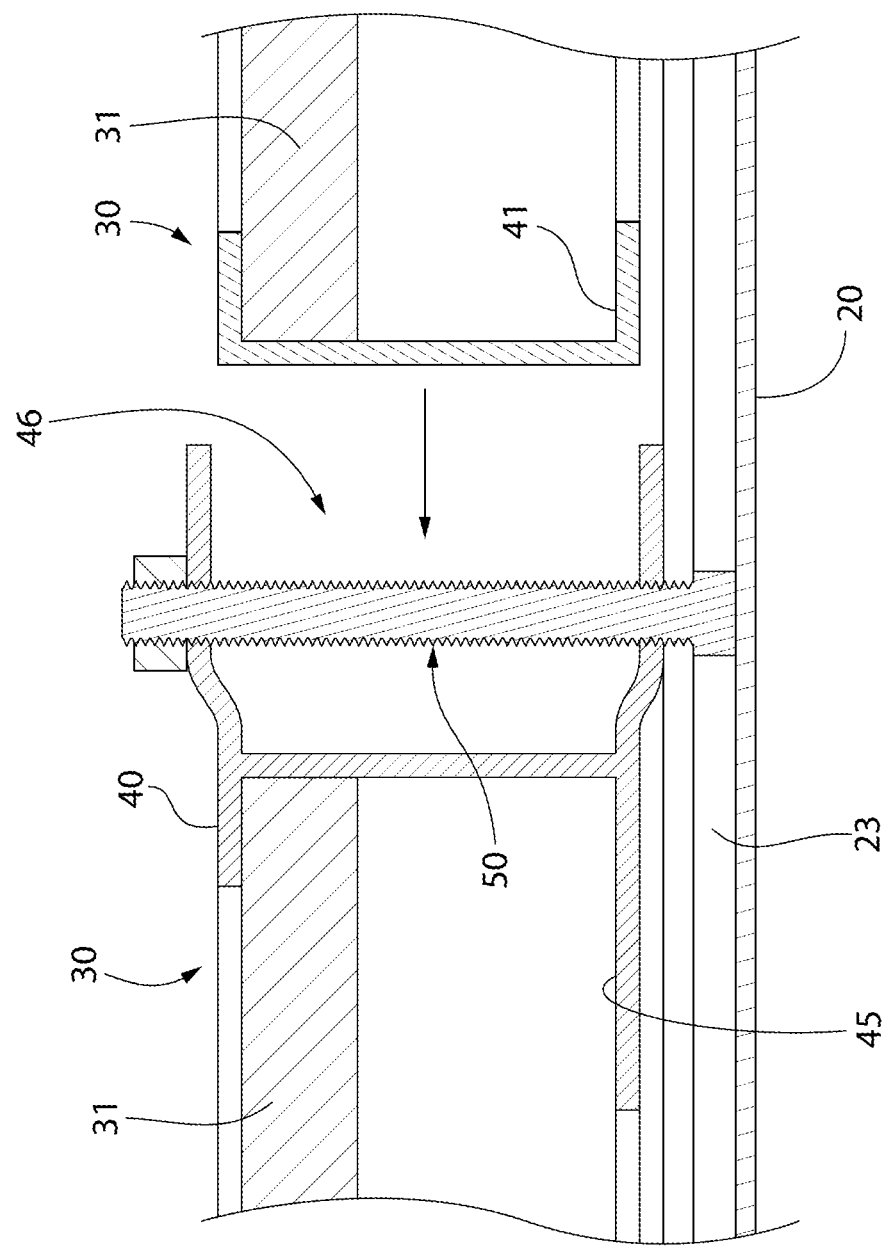
Figure 10:
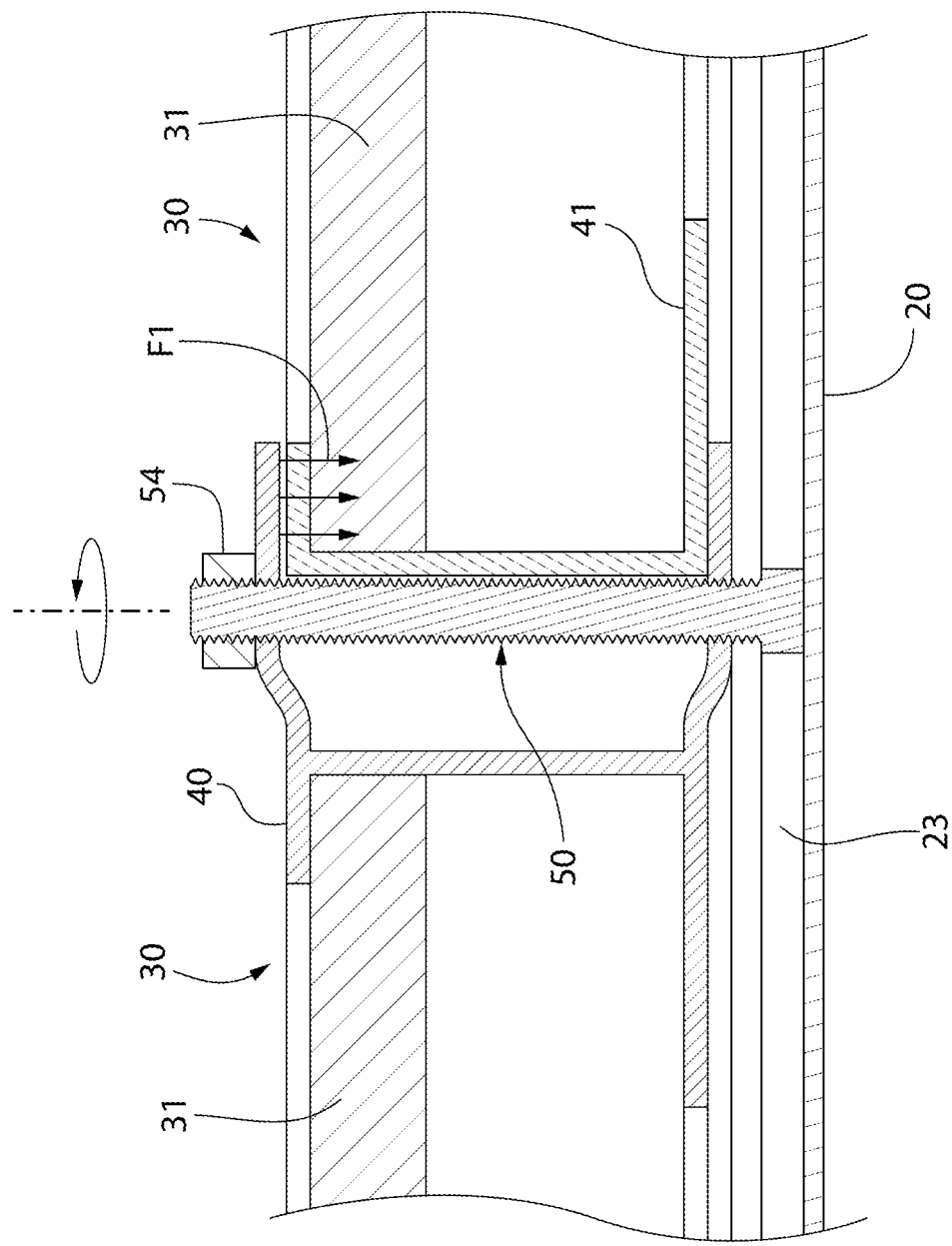
Figure 11:
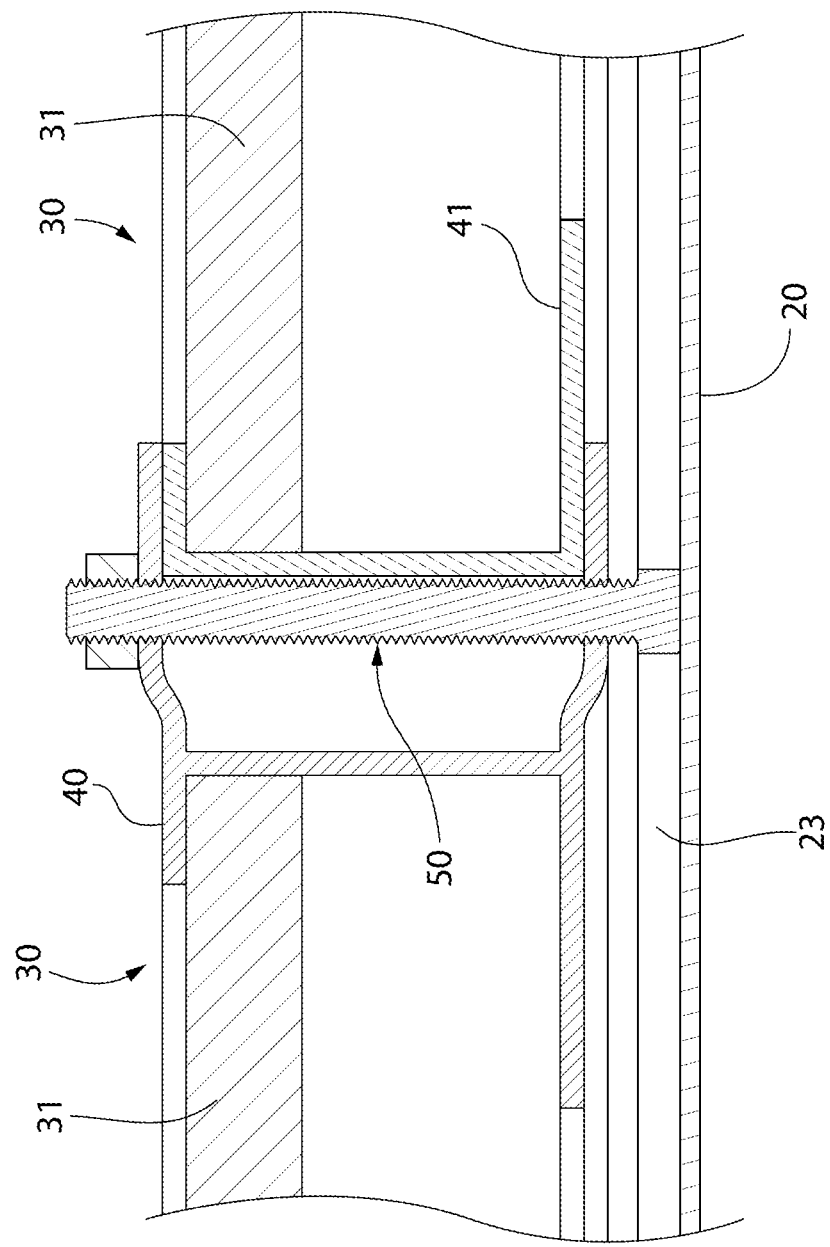
Figure 12:
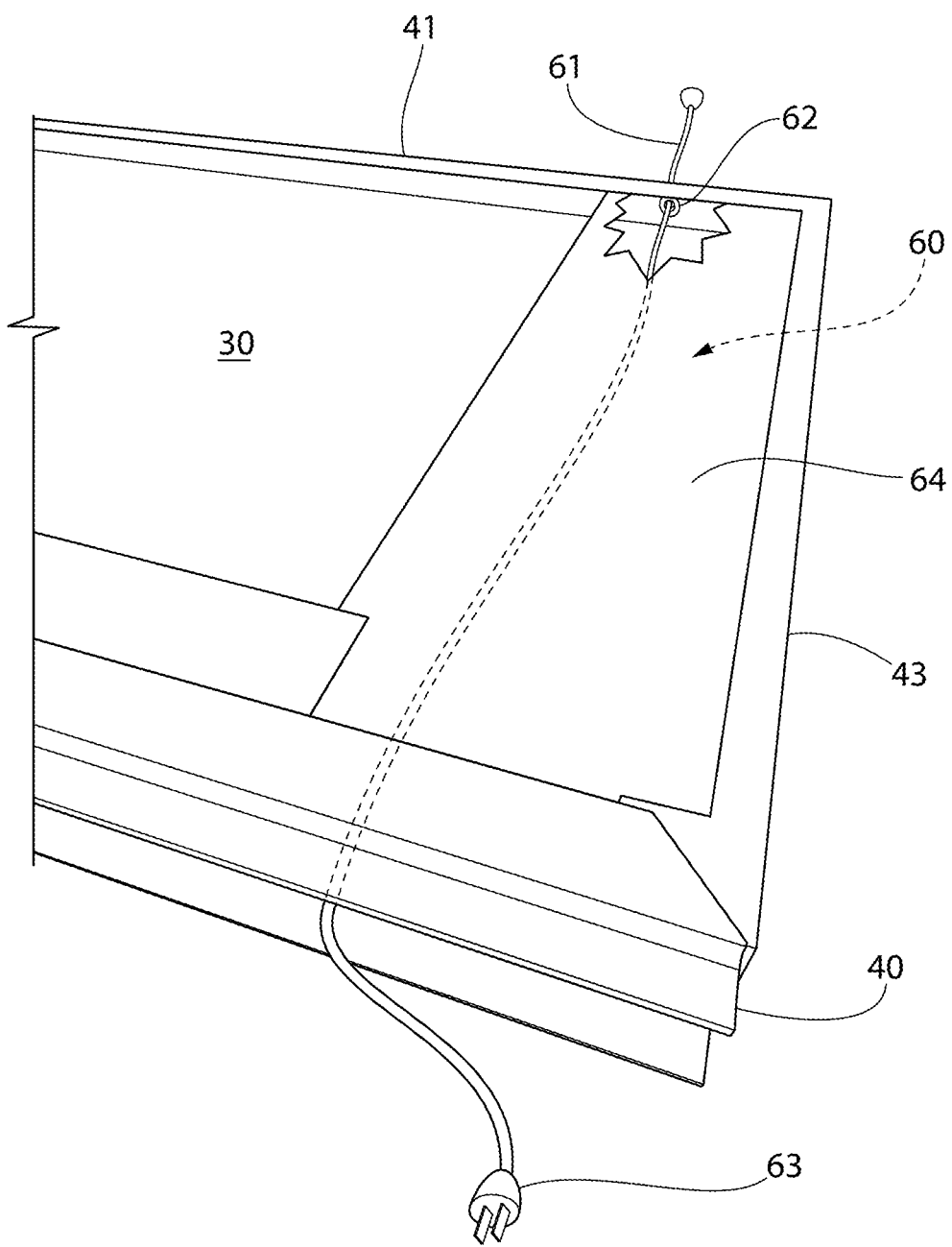
FIG. 12 is a rear perspective view of the solar panel showing internally routed conductive power/control cables protected by a metal cable cover.

With the first solar panel 30 now in place on the main support rails, the method continues by aligning and inserting the peripheral side edge frame of a second solar panel 30 into the outward facing cavity 46 of H-shaped locking frame member 40 of the first solar panel (see, e.g. FIGS. 9 and 10). The second solar panel 30 may be inserted until its peripheral side edge (e.g. defined by basic C-shaped frame member 41 opposite the H-shaped frame member 40 of the second panel) abuttingly engages the shank of the captive T-bolt assembly 50 in the first solar panel 30.

Once the second solar panel is fully in proper inserted position, the T-bolt assemblies 50 on the first solar panel 30 may be fully tightened to a second degree greater than the first degree by rotating the nut to the desired degree of tightness or torque value (e.g. inch-lbs.) beyond the point necessary to previously lock the T-bolts 51 to the main support rails 20 by using an electric driver drill or manual socket wrench as non-limiting examples. This tightening step deforms the clamping portion of locking frame member 40 on the first solar panel and displaces the top flange of frame member 40 above the outer cavity 46 downwards, thereby imparting a compressive clamping force F1 acting on the frame member 41 of peripheral frame 32 of the second solar panel 30 (see, e.g. FIG. 10). The second panel is now fully engaged and clamped between the top and bottom flanges 45-1, 45-2 of the locking frame member 41 of the first solar panel 30 (see, e.g. FIG. 11). It bears noting that the opposing top and bottom flanges of first solar panel locking frame member 40 act as compressible jaws which apply the compressive force to retain the second member, not a clamp/washer of the mounting hardware as in the past practices previously described herein. The presently disclosed T-bolt assemblies 50 therefore advantageously provide a more positive clamping action and more uniformly distributed clamping force F1 to the second solar panel 30.

The process of fully tightening the T-bolt assembly 50 to lock the second solar panel 30 in position also concurrently and positively locks the peripheral frame of the first solar panel in horizontal/longitudinal position along the main support rails 20. However, there is no compressive clamping force applied to the peripheral frame of the first solar panel by its H-shaped frame member 40 because the T-bolt assembly 50 only acts within the outward facing cavity 46 in the clamping portion of the locking frame member 40 outboard of the vertical web 45-3, not the inward facing cavity 45 coupled to the photovoltaic cell array.

During placement of the second solar panel 30, the second solar panel may be temporarily secured to the main support rails 20 via its captive T-bolt assemblies 50 using the same methodology described above for the first solar panel. This allows adjustment of the second solar panel in position along the rails 20 as needed to insert the peripheral side edge of the second solar panel into the clamping portion of the first solar panel. A third solar panel 30 may then be coupled to the second solar panel in the same manner used to couple the second solar panel to the first solar panel, and so on for each success solar panel mounted in the array.

It bears noting that the present T-bolt assembly 50 eliminates the need for the clamp or washer used in previous solar panel mounting system hardware s in which the mounting hardware is shipped loose and not captured or pre-installed on the panel frame as in the present invention. Advantageously, the present disclosure captive T-bolt assemblies 50 not only eliminate the loss of the panel mounting hardware at the installation site, but increases the speed with which the installation process can be completed in an efficient and convenient manner in the field.

According to other aspects of the invention, a cable management system is provided which is configured to both minimize time required for making electrical/control cable connections and eliminate or minimize post-installation damage to control/electrical cables and electrical equipment caused by rodents. Referring to FIGS. 5, 12, and 13-16 each solar panel 30 may include a covered rear cable compartment 60 with detachable removable cover 64 for enclosing electrical equipment such as electrical junction boxes 67 and routing power/electrical cables 61 from and through one lateral peripheral frame member 40 to the opposite lateral peripheral frame member 41. Because a series of solar panels are typically mounted in horizontal rows in series fashion, and the H-shaped locking frame member 40 is intended to be on one vertical side of the solar panel, this arrangement allows adjacent panels in the row to be electrically connected together. The side peripheral lateral frame members (including the H-channel locking frame member 40 and opposing C-channel frame member 41) may each include a laterally open cable aperture or hole 62 communicating with the enclosed cable compartment 60 and fitted with a rubber/elastomeric sealing grommet 62 for extending the cables 61 outward beyond the frame to make the inter-panel electrical cable connections. The grommets 62 are preferably configured to provide a tight leak-resistant and snug fit to the cable to prevent ingress of water and rodents. The two opposing ends of the cable 61 may be terminated with suitable male/female electrical couplers such as end plugs 63 for forming the electrical connection to and between the adjacent solar panels. A simplistic standard pronged electric male end plug 63 is shown for convenience as an example, recognizing that any type of mating male/ female electrical end plugs or couplings including locking/latching type plug sets may be used to electrically couple the cables of adjacent solar panels together. Advantageously, routing the cables 61 internally within the panel 30 through the covered cable compartment 60 and grommeted openings eliminates the past need for field routing cables externally to and underneath the solar panels and using a multitude of cable clips which is a time-consuming process. The internal cable routing further denies access to rodents eager to chew on exposed cables.

In one embodiment, as shown in FIGS. 12-16, cable compartment cover 64 may have a longitudinally elongated body oriented parallel to longitudinal axis LA of solar panel 30. The cover body may have an acutely angled configuration in one embodiment as shown and including opposing longitudinal mounting edges 65, 66. One edge 65 is configured for detachable mounting to the bottom flange or wall of C-channel frame member 43 while the opposite edge 65 is configuration for mounting to the underside of the photovoltaic cell array 31. Any suitable type of edge constructions, configurations, and methods may be used for removably attaching cover 64 to the underside/rear of the solar panel 30 to preferably fully enclose cable compartment 60, such as for example without limitation snap fitted interfaces, threaded fasteners, or combinations thereof. In one, mounting edge 65 may be configured as a grounding type WEEB ("washer, electrical equipment bonding") type interface similar to those commercially available from Wiley Electronics which includes provisions such as threaded posted for grounding the solar frame.

Figure 14:
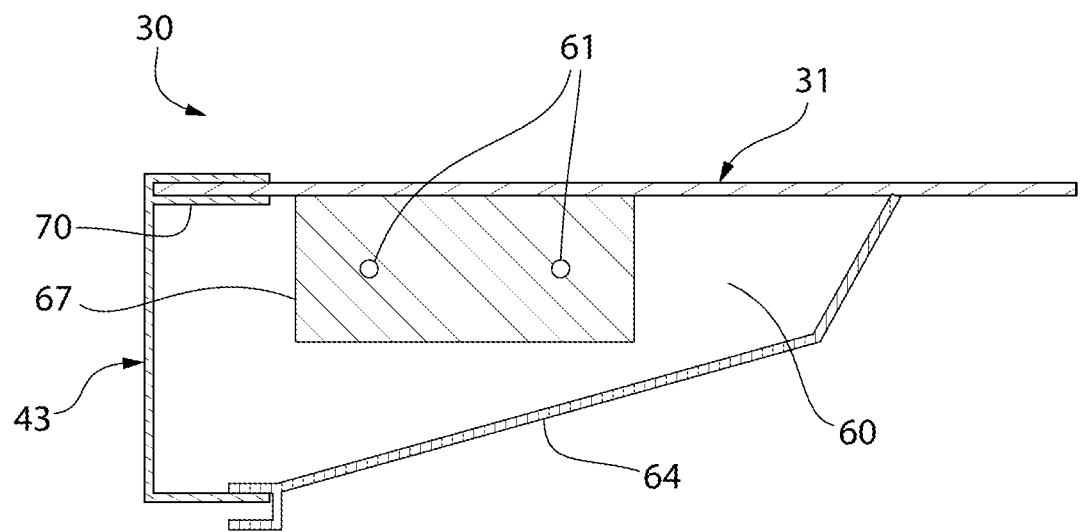
FIG. 14 is side cross-sectional side view of the metal cable cover of FIG. 12.
Figure 15:
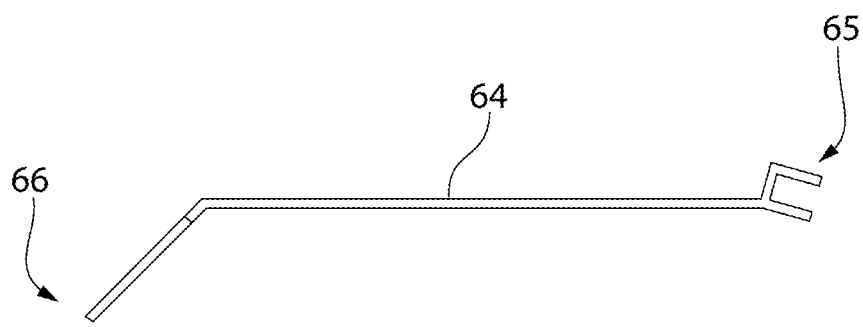
FIG. 15 is a side view of the cable cover of FIG. 14.
Figure 16:
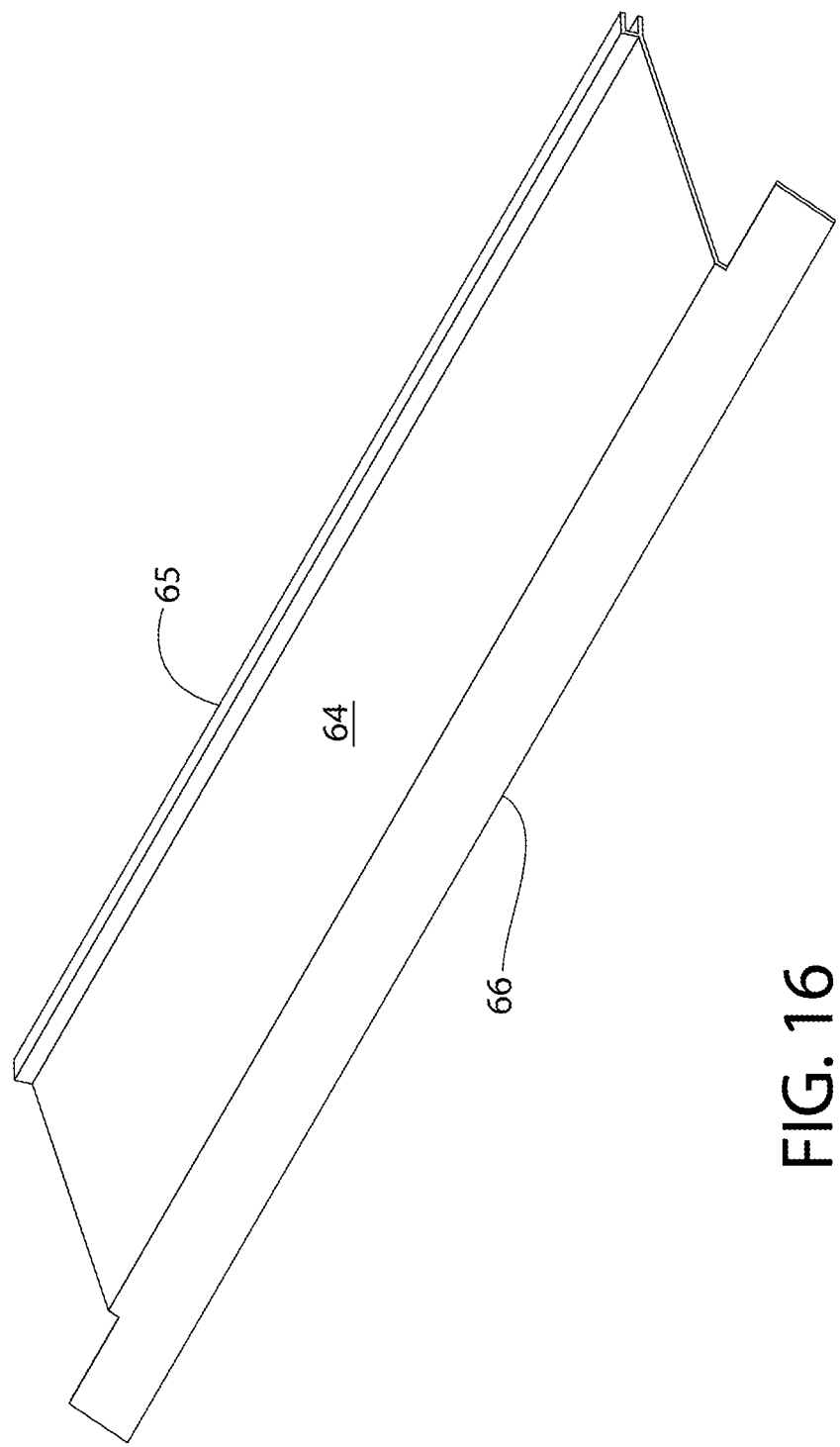
FIG. 16 is a perspective view thereof.

As shown in FIG. 14, the lateral frame members such as the H-channel locking frame member 40 and opposing C-channel frame member 41 may include an intermediate support flange 70 oriented perpendicularly to the lateral sides of the frame members to support the photovoltaic cell array 31 where the array has a thickness less than the height or depth between the top and bottom flanges or walls of the frame members. This may be used with any of the frame constructions disclosed herein regardless of whether a covered cable compartment is provided or not.

While the foregoing description and drawings represent exemplary ("example") embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A solar panel mounting system comprising:
a first solar panel comprising a peripheral frame configured for supporting a perimeter of a photovoltaic cell array;
the peripheral frame including a plurality of primary frame members and a locking frame member having a deformable clamping portion;
the locking frame member being perimetrically elongated in length and coupled to a pair of the primary frame members to form an integral part of the peripheral frame;
a rotatable captive bolt assembly mounted through the locking frame member;
the locking frame member configured for slideably receiving a peripheral side edge of an adjacent second solar panel at least partially therein;
wherein tightening the captive bolt assembly deforms the clamping portion of the locking frame member and clamps the second solar panel in place.

2. The system according to claim 1, wherein the captive bolt assembly extends through the clamping portion of the locking frame member.

3. The system according to claim 2, wherein the bolt assembly is a T-bolt assembly comprising a T-bolt having an elongated head and an at least partially threaded shank, and a nut threadably engaging the shank.

4. The system according to claim 3, wherein the clamping portion of the locking frame member defines an outwardly open cavity configured to receive the peripheral side edge of the second solar panel at least partially therein.

5. The system according to claim 4, wherein the peripheral side edge of the second solar panel abuttingly contacts the shank of the T-bolt when inserted into the outwardly open cavity of the locking frame member.

6. The system according to claim 4, wherein the locking frame member further includes an inwardly open cavity which receives a peripheral side edge of the photovoltaic cell array therein.

7. The system according to claim 6, wherein the inwardly open cavity is located opposite to the outwardly open cavity and separated therefrom by a vertical web of the locking frame member.

8. The system according to claim 7, wherein the locking frame member is an H-shaped structural member in cross section.

9. The system according to claim 8, wherein the inwardly open cavity of the locking frame member is shorter in height than the outwardly open cavity.

10. The system according to claim 7, wherein T-bolt assembly is located outboard of the vertical web of the locking frame member.

11. The system according to claim 3, wherein the locking frame member has an H-shaped cross-sectional profile and includes a laterally open inner cavity supporting the photovoltaic cell array and opposite laterally open outer cavity which receives the peripheral side edge of the second solar panel.

12. The system according to claim 11, wherein the locking frame member includes a horizontal top flange, horizontal opposing bottom flange, and vertical web extending therebetween which separates the inner cavity from the outer cavity.

13. The system according to claim 12, wherein the top and bottom flanges each include a step-shaped transition arranged such that the outer cavity is higher than the inner cavity.

14. The system according to claim 12, wherein the shank of the T-bolt extends vertically through the outer cavity.

15. The system according to claim 3, further comprising:
a pair of parallel spaced support rails configured for mounting to a support structure, the first and second solar panels arranged on the support rails;
a pair of the T-bolt assemblies extending through the clamping portion of the locking frame member at locations coinciding with the support rails; and
the heads of the T-shaped bolts are insertable into a longitudinally-extending fastening channel of the support rails.

16. The system according to claim 15, wherein the T-bolt are rotatable between a locked position in which the T-bolts are locked to the fastening channels of the support rails and not removable therefrom, and an unlocked position in which the T-bolts are removable from the fastening channels.

17. The system according to claim 16, wherein the locking head of each T-bolt comprises a pair of diagonally opposed angle chamfered locking corners which frictionally engage opposing lateral sidewalls of the fastening channel when the T-bolt sets are rotated from the unlocked position into the locked position.

18. The system according to claim 17, wherein a substantially flat-to-flat interface is created between the locking corners and lateral sidewalls of fastening channel for optimum frictional engagement.

19. The system according to claim 11, wherein the plurality of primary frame members have a C-shaped cross-sectional profile.

20. The system according to claim 1, further comprising a power cable internally routed through the first solar panel inside a cable compartment between the locking frame member and an opposing one of the primary frame members.

21. The system according to claim 20, further comprising deformable cable grommets mounted to the locking frame member and the opposing one of the primary frame members through which the power cable enters and leaves the cable compartment and the first solar panel.

22. The system according to claim 1, wherein the locking frame member of the peripheral frame is not separable from the primary frame members.

23. A solar panel mounting system comprising:
a first solar panel comprising a peripheral frame which engages peripheral edges of a photovoltaic cell array at its perimeter;
the peripheral frame including a plurality of perimetrically elongated frame members coupled together at their ends in an orthogonal arrangement, a locking one of the frame members having a deformable clamping portion;
a rotatable captive bolt assembly mounted through the clamping portion of the locking one of the frame members;
the clamping portion of the locking one of the frame members being outwardly open and configured for slideably receiving a peripheral side edge of an adjacent second solar panel at least partially therein;
wherein tightening the captive bolt assembly deforms the clamping portion and locks the second solar panel to the locking one of the frame members.

24. The system according to claim 23, wherein the locking one of the frame members comprises a first end coupled to a first one of the frame members and an opposite second end connected to a second one of the frame members.

25. The system according to claim 24, wherein the locking one of the frame members is oriented perpendicularly to the first and second ones of the frame members.

26. The system according to claim 25, wherein the locking one of the frame members of the peripheral frame is not separable from the first and second ones of the frame members.

27. The system according to claim 23, wherein the bolt assembly is a T-bolt assembly comprising a T-bolt having an elongated head and an at least partially threaded shank, and a nut threadably engaging the shank.

28. The system according to claim 27, wherein the clamping portion of the locking one of the frame members defines an outwardly open cavity configured to receive the peripheral side edge of the second solar panel at least partially therein.

29. The system according to claim 28, wherein the peripheral side edge of the second solar panel abuttingly contacts the shank of the T-bolt when inserted into the outwardly open cavity of the locking frame member.

30. The system according to claim 28, wherein the locking one of the frame members further includes an inwardly open cavity which receives one peripheral edge of the photovoltaic cell array therein, the inwardly open cavity having a smaller height than the outwardly open cavity.

* * * * *